US007720855B2

(12) United States Patent
Brown

(10) Patent No.: US 7,720,855 B2
(45) Date of Patent: May 18, 2010

(54) SOCIAL NETWORK FOR AFFECTING PERSONAL BEHAVIOR

(76) Inventor: Stephen J. Brown, 3324 Woodside Rd., Woodside, CA (US) 94062

( * ) Notice: Subject to any disclaimer, the term of this patent is extended or adjusted under 35 U.S.C. 154(b) by 427 days.

(21) Appl. No.: 11/983,126

(22) Filed: Nov. 6, 2007

(65) Prior Publication Data
US 2009/0012988 A1    Jan. 8, 2009

Related U.S. Application Data

(60) Provisional application No. 60/947,449, filed on Jul. 2, 2007.

(51) Int. Cl.
*G06F 17/30* (2006.01)
(52) U.S. Cl. .................. 707/758; 709/203; 709/217; 709/224
(58) Field of Classification Search ............ 705/14, 705/26; 707/4, 104.1; 709/203, 217, 224
See application file for complete search history.

(56) References Cited

U.S. PATENT DOCUMENTS

| 6,385,619 | B1 * | 5/2002 | Eichstaedt et al. ....... 707/104.1 |
| 6,611,842 | B1 | 8/2003 | Brown |
| 7,254,588 | B2 * | 8/2007 | Sung et al. ............... 707/104.1 |
| 7,624,103 | B2 * | 11/2009 | Wiegering et al. ............. 707/4 |
| 2001/0047125 | A1 | 11/2001 | Quy |
| 2001/0049470 | A1 | 12/2001 | Mault et al. |
| 2002/0109600 | A1 | 8/2002 | Mault et al. |
| 2006/0184617 | A1 * | 8/2006 | Nicholas et al. ............. 709/203 |
| 2007/0106753 | A1 * | 5/2007 | Moore ........................ 709/217 |
| 2007/0150368 | A1 * | 6/2007 | Arora et al. .................... 705/26 |
| 2007/0168463 | A1 * | 7/2007 | Rothschild .................. 709/217 |
| 2007/0233736 | A1 * | 10/2007 | Xiong et al. ............. 707/104.1 |
| 2007/0266097 | A1 * | 11/2007 | Harik et al. ................. 709/204 |
| 2007/0288319 | A1 * | 12/2007 | Robinson et al. .............. 705/14 |
| 2008/0016211 | A1 * | 1/2008 | Hillary et al. ............... 709/224 |
| 2008/0126476 | A1 * | 5/2008 | Nicholas et al. ............. 709/203 |

* cited by examiner

*Primary Examiner*—Shahid A Alam
(74) *Attorney, Agent, or Firm*—Lumen Patent Firm

(57) ABSTRACT

A social network for affecting personal behavior is provided. The psychological and behavioral progress of a registered user of the social network is maintained. The social network provides the registered user with friends who can track the user's progress and encourage the user by communications with the user. The friends of the user can be anybody, including people who are not registered with the social network. A dynamic mechanism for grouping different users into support groups is also provided. The grouping is based on the user's progress, satisfaction with the user's supporters, and the user's traits and preferences. User-customized profiles are used to elucidate user traits instead of standard direct forms to avoid incorrect or misleading responses to the forms. In addition, a wireless portable device in communication with the social network of friends and supporters is provided for constant access to sources of motivation.

19 Claims, 11 Drawing Sheets

R = registered user of the social network
V = not registered viewer of the social network
$R_F$ = registered user and friend of R*
$V_F$ = not registered viewer and friend of R*

100

Figure 8
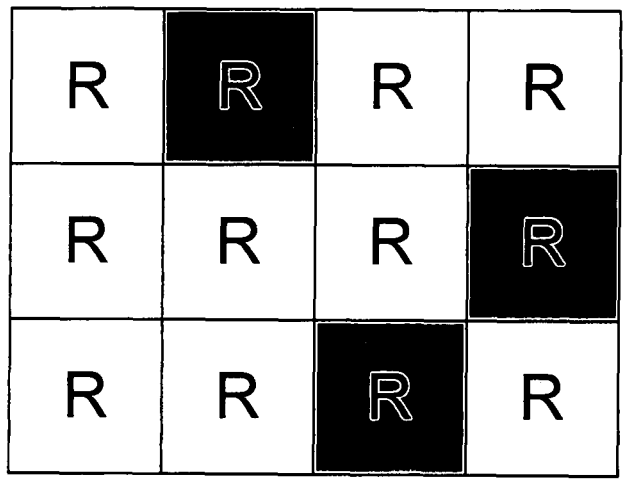
Fig. 8A
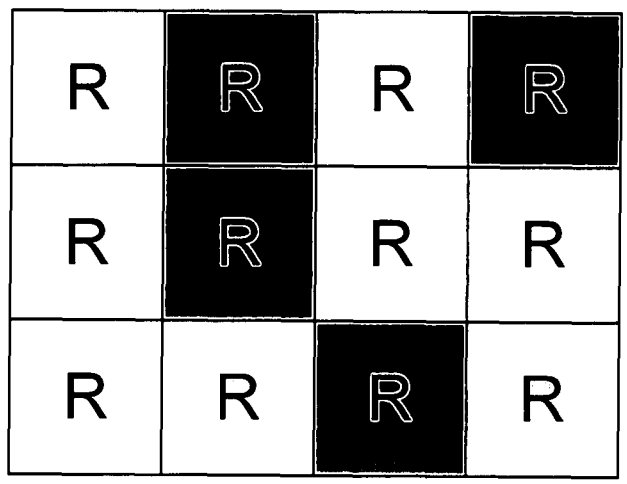
Fig. 8B
☐ = support group 1
☐ = support group 2
■ = support group 3

SOCIAL NETWORK FOR AFFECTING PERSONAL BEHAVIOR

CROSS-REFERENCE TO RELATED APPLICATIONS

This application claims priority from U.S. Provisional Patent Application No. 60/947,449, filed Jul. 2, 2007, which is hereby incorporated by reference.

FIELD OF THE INVENTION

The invention relates generally to computer implemented social networks. More particularly, the present invention relates to social networking for affecting personal behavior.

BACKGROUND

There is widespread desire to undergo personal behavioral modifications, though adopting lasting modifications can be extremely challenging. One common personal behavioral change sought by many is weight loss. Numerous traditional methods, such as books and videos, provide diet regimens and exercise routines to provide assistance for weight loss. However, such traditional methods are often ineffective due to the lack of emphasis on motivation and accountability. Other traditional methods for weight loss include joining exercise and nutrition classes or hiring a personal trainer. These methods can be expensive, time-consuming, and incompatible with a busy schedule.

Today, Internet-based services are widespread and ubiquitous, including weight loss services. Typically, Internet-based weight loss services are similar to traditional methods by merely disseminating diet and/or exercise guidance through expert advice, articles, and tips. The programs are largely impersonal and lack the key motivational ingredient to affect lasting personal behavioral changes. WeightWatchers.com and Traineo.com are websites dedicated to weight loss. Traineo.com allows its users to track their progress and send emails to others associated with the network to observe the users' progress.

Social networking websites, such as Facebook.com, MySpace.com, and Friendster.com, offer online communities where a user can find and maintain friendships. A user of an online social network is commonly able to post text, display pictures, send and receive messages from other members of the network, and join common interest groups. To become a member of an online social network community, the websites generally require registration. In other words, only registered or affiliated members of a social network can participate in the network.

Social networking websites require users to create descriptions of themselves by filling out many forms about the personality traits and interests of the users. The requirement of submitting tedious responses may turn off potential users. A user can use the descriptions to find other users with commonalities, though oftentimes this does not occur; a user description on a social networking site may inaccurately describe a user because the user can mistakenly or intentionally submit misleading information. A user often creates a description of an idealized person the user desires to be instead of a description representing the user's real traits and personalities. Methods to obtain accurate personality traits, preferences, motivations, and interests are desired.

Affecting lasting personal behavioral change requires persistence and motivation. A person seeking to undergo personal behavioral change generally requires accountability and motivation. For people with busy schedules or who travel frequently, the sources of motivation are difficult or impossible to access. These times of inaccessibility can be detrimental to the person's overall behavioral change goals.

The present invention addresses the difficult problem of affecting personal behavior and advances the art with a social network for affecting personal behavior.

SUMMARY OF THE INVENTION

The present invention provides a computer implemented social network for affecting personal behavior. A registered user of the social network, who desires to undergo behavioral modifications, has his or her personal behavior affected by one or more friends. The friends affect the user's personal behavior by motivating the user and keeping the user accountable. Motivation and accountability exist in the present invention by the ability of friends of the user to send encouraging messages and to monitor the progress of the user, respectively. A friend of the user may be anyone, including other registered users of the social network and people not associated with the social network. A user may invite anyone to be a friend of the user and help the user achieve his or her goal. Not registered friends of a user can also be invited to register with the social network.

The present invention further provides the user the ability to update and maintain his or her progress in terms of the user's psychological state and behavioral actions related to the personal behavior the user wishes to change. For example, in an embodiment where the social network is for weight loss, behavioral actions can be water consumption, fruit and vegetable consumption, and physical activity. The progress of the user can be charted. The progress is viewed by the user and by friends of the user. The friends then send messages related to the viewed behavior. Optionally, an automatic message is sent to the user whenever a friend views the user's progress.

In the present invention, a user registers with the social network by creating a user profile. The profile displays the psychological state and behavioral actions. The user profile is easy to create and customize. Customization includes choosing themes and icons, representing the psychological state and behavioral actions of the user. The user-customized profile is used to reveal personal traits and preferences of the user. According to the present invention, support groups of registered users can be formed based on the revealed traits and interests. Members of a support group can affect each other's personal behavior in the same manner that friends of a user affect the behavior of the user. Members of a support group may also rate the support group. The support group ratings, progress of the users, and changes to user profiles can be used to regroup the registered users into different support groups. By this feedback grouping and regrouping mechanism, the present invention provides an ability to learn criteria for successful support groups.

An example system of the present invention includes an application server for running the online social network, a wireless gateway, and a portable device operated by a registered user of the social network. The wireless gateway enables two-way communication between the application server and the portable device. The portable device can be any wireless device that the user can carry or wear while traveling or performing activities. The portable device allows a user to view and log data on the psychological state and behavioral actions of the user onto the social network. Friends of the user can view the logged data and send encouraging messages to the user.

The present invention advances the art of affecting personal behavior by using a social network as a source of motivation and accountability. The present invention opens the possibility for anyone to be a friend to help a user of the social network and provides the user with compatible and helpful supporters. Also, the present invention provides a means for the user to access motivators by way of a portable device.

BRIEF DESCRIPTION OF THE FIGURES

The present invention together with its objectives and advantages will be understood by reading the following description in conjunction with the drawings, in which:

FIG. 8 shows a examples of distributions of support groups of registered users of the social network according to the present invention.

DETAILED DESCRIPTION OF THE INVENTION

Oftentimes the difficulty in modifying personal behavior is not the identification of the necessary changes, but the incorporation of the changes to a person's lifestyle. Support, motivation, and accountability with numerous friends would aid in the incorporation of these behavioral changes. Below is a detailed description of a computer implemented social network for affecting personal behavior.

Figure 1:
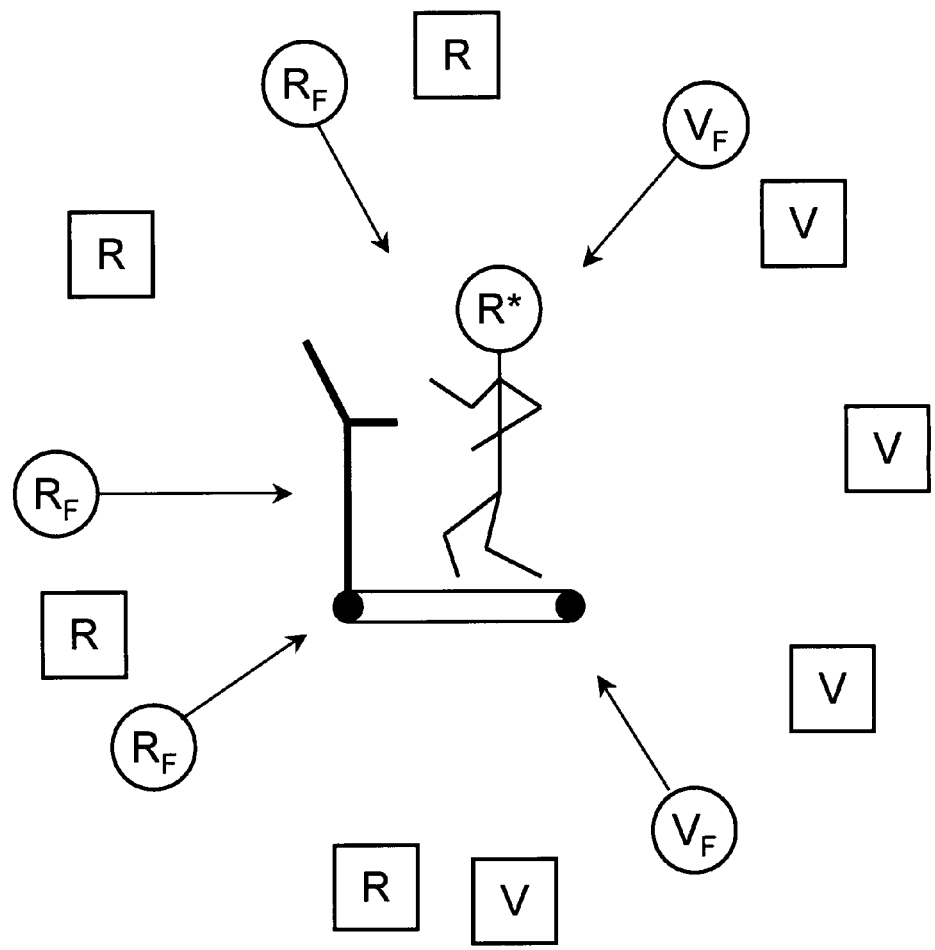
FIG. 1 shows an example of a social network for affecting personal change according to the present invention, where friends (F) of a user (R*), who are registered users (R) and not registered viewers (V) of the network, are motivating the user (R*).

FIG. 1 shows an example of a registered user R* whose personal behavior is being affected in a computer implemented social network 100 of registered users R to the network and not registered viewers V. The personal behavior of user R* is affected by friends of the user. A friend is a personal behavior affecter within the social network who is linked with the user, can view data posted by the user, and communicate with the user through the social network.

It is important to note that the friends affecting the personal behavior of user R* are composed of registered user friends $R_F$ and viewer friends $V_F$, who are not registered, affiliated, or associated with the social network. In FIG. 1, the friends of user R* are encouraging the user through motivational messages to affect the personal behavior of the user R*.

In addition to a user's friends, a professional coaching content provider, not shown in FIG. 1, may also be linked with the user to affect the personal behavior of the user. The coaching content provider may or may not be registered with the social network. The coaching content provider may be free or require payment.

Figure 2:
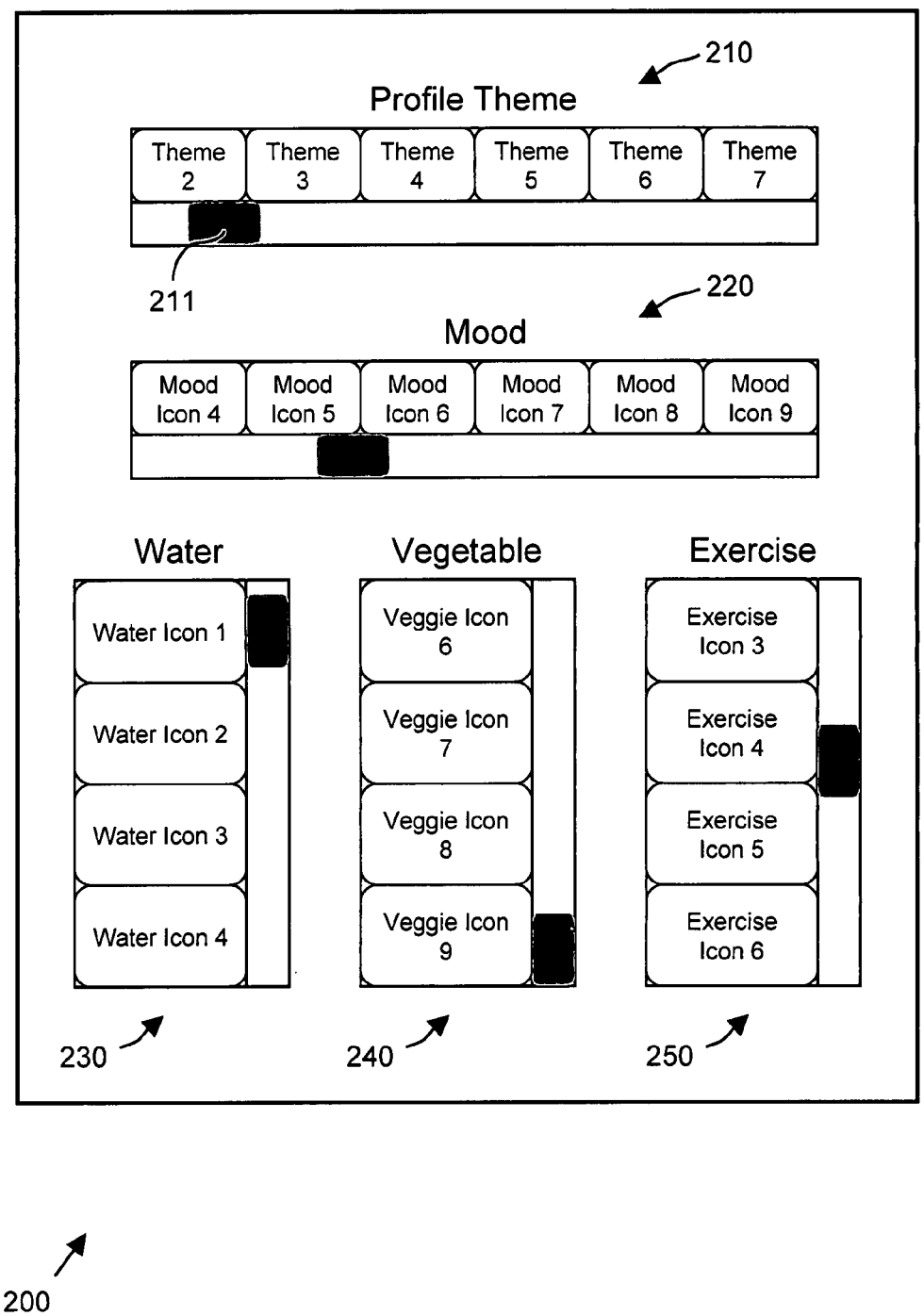
FIG. 2 shows an example of a graphical user interface (GUI) for creating a user profile according to the present invention.

To register with the social network, a user must create a customized personal user profile by using a profile creating graphical user interface (GUI) 200, an example of which is shown in FIG. 2. The customized user profile is used to determine personal traits and interests of the user in a simple and subtle manner without relying on tedious forms. For example, the user profile function allows the user to create a profile by selecting from a list of themes 210 for the user profile and selecting icons that represent behavioral actions and psychological states. The theme may include color schemes and layouts. A behavioral action is an activity undertaken by a user. The activity is related to the behavioral change the user wishes to undergo. A psychological state represents a user's emotional status, e.g. the mood of the user. Optionally, personal attributes, including a username, a password, email address, city, state, birthday, gender, and relationship status, may be entered.

For a social network for weight loss, behavioral actions and their representative icons may include servings of water consumed 230, servings of fruits and vegetables eaten 240, and amount of physical exercise 250. In one embodiment, the amount of physical exercise can be quantized into ten minutes of intentional physical activity. A mood icon 220 may also be selected. Optionally, a user can select a coach character. The coach character may be a dog, cat, another animal, or a fictitious character. The coach character can be an animated graphical image displayed on the user profile. An additional feature of the invention is a function for a user to enter payment information. The payment information can be used to facilitate purchases of services and goods, e.g. to pay for coaching content from a professional coaching content provider.

Figure 3:
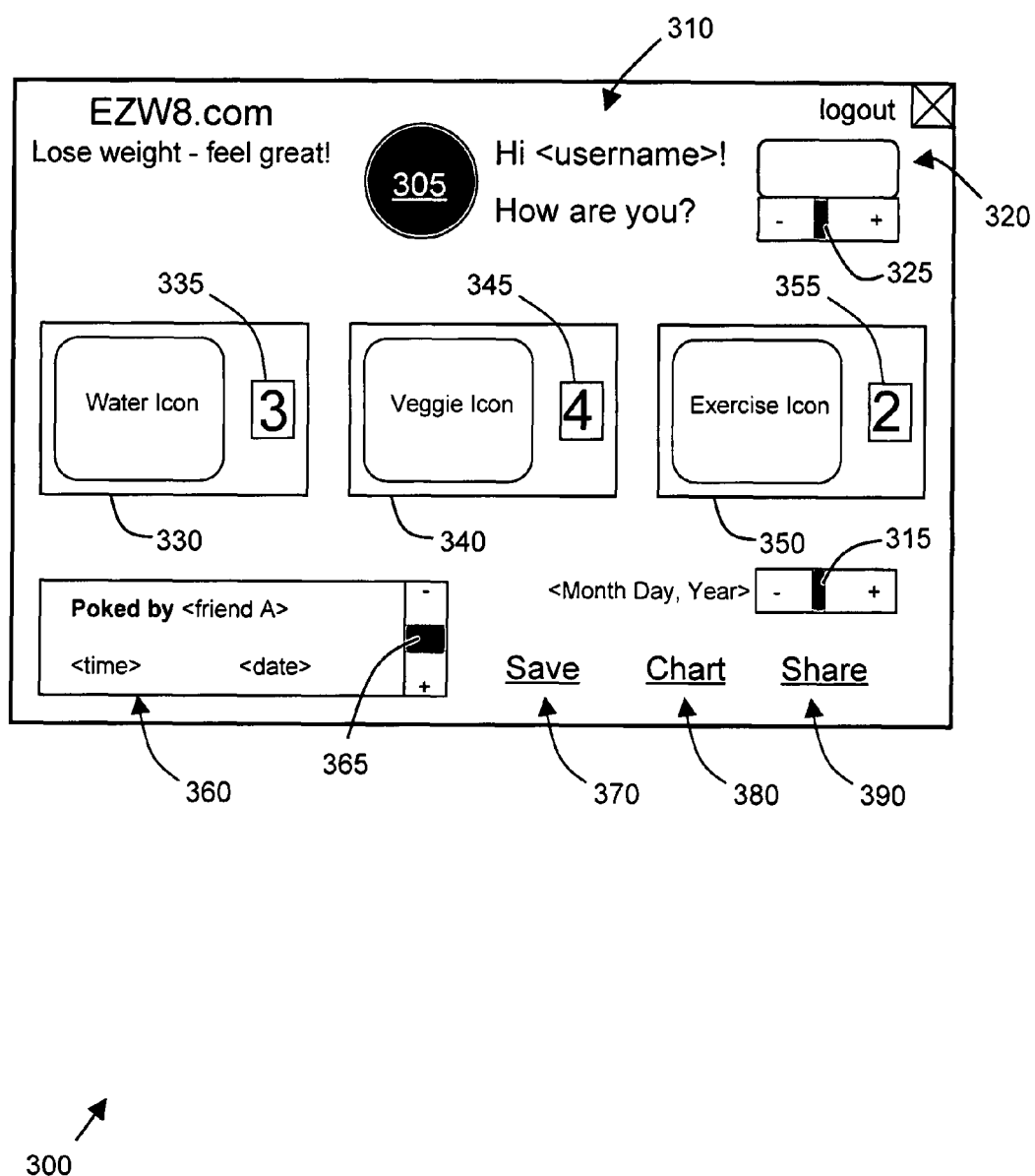
FIG. 3 shows an example of a GUI for displaying and updating user activity according to the present invention.
Figure 4:
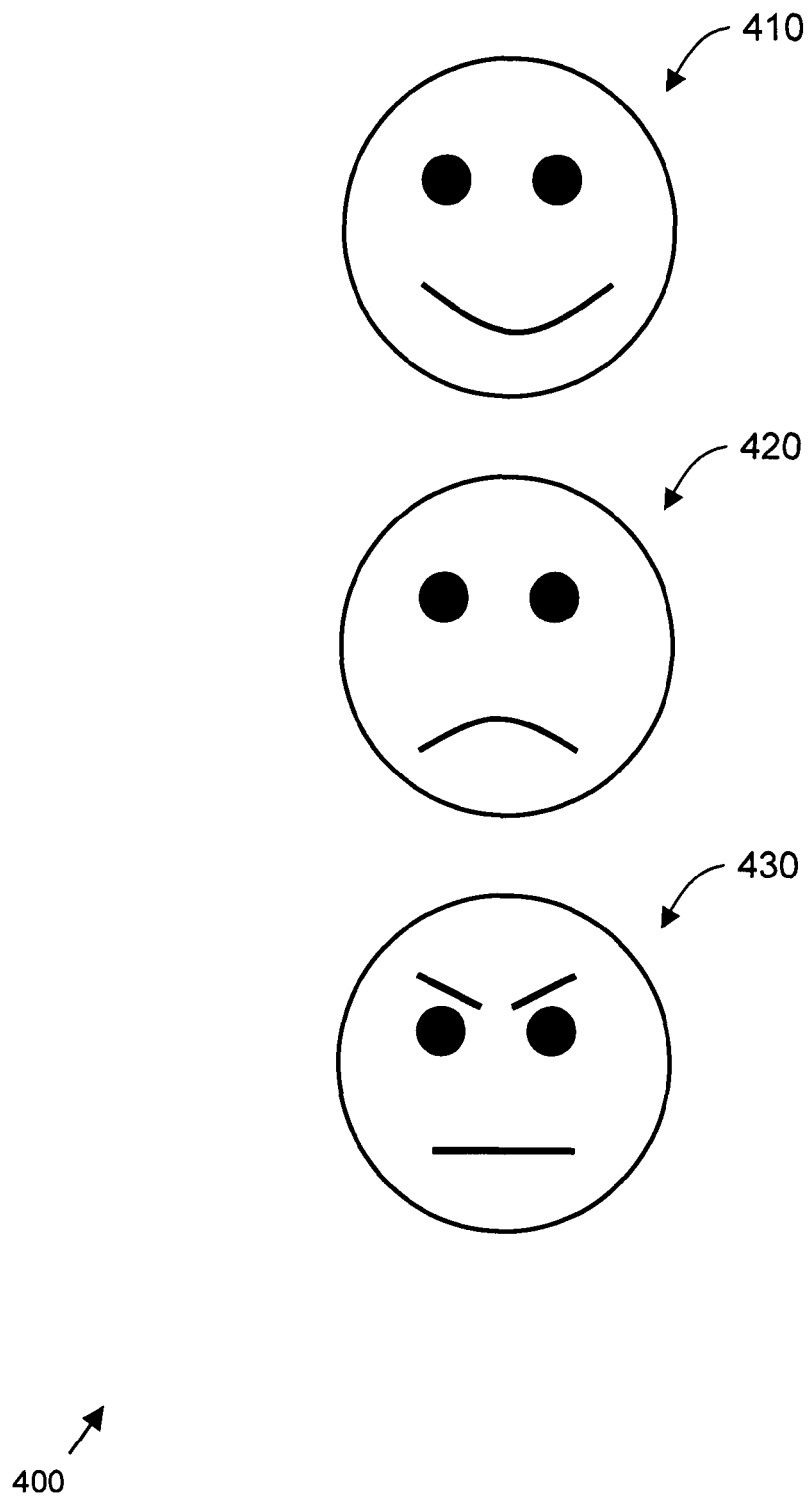
FIG. 4 shows examples of emoticons according to the present invention.

FIG. 3 shows an example of a user profile 300. The user profile 300 displays the username 310, a psychological state of the user 320, and behavioral actions 330, 340, and 350. The user can change his or her psychological state by moving a scroll bar 325 through a list of predetermined emotional states such as bad, better, good, guilty, sick, sorry, well, down, alone, happy, great, sad, lost, tired, lonely, horrible, pretty, special, loved, depressed, fine, confident, big, important, complete, fat, proud, stressed, helpless, angry, ashamed, needed, scared, beautiful, hungry, satisfied, handsome, frustrated, insecure, calm, emotional, and motivated. Alternatively, the user can select from a list of emoticons, icons representing various emotions. Examples of a happy emoticon 410, a sad emoticon 420, and an angry emoticon 430 are displayed in FIG. 4.

The user may also update his or her behavioral actions. In a preferred embodiment, the behavioral actions include the amount of water consumed 330, the number of servings of fruits or vegetables consumed 340, and the amount of intentional exercise 350. The quantities are updatable. For instance, an exercise text field 355 can be changed to accurately reflect the amount of exercise undertaken by the user on a particular day. Alternatively, buttons are available to increase and decrease quantities of behavioral actions. The updated profile can be saved by clicking the save button 370.

The date can be displayed on the user profile 300 and the user can use a scroll bar 315 to see his or her activity on different days. In addition, a chart function 380 is available for a graphical view of the user's progress. The charts may show one or more behavioral actions or psychological states as a function of time. For instance, a chart may show the number of servings of water drank by the user per day over the past week.

The user profile 300 includes a text box 360 where messages from the user's friends are posted. Timestamps may be included in the text box 360. A scroll bar 365 may be used to scroll through different messages displayed in the text box 360 enabling the user to view messages from different dates and times. Furthermore, an animated coach character 305 may also be displayed on the user profile 300.

Figure 5:
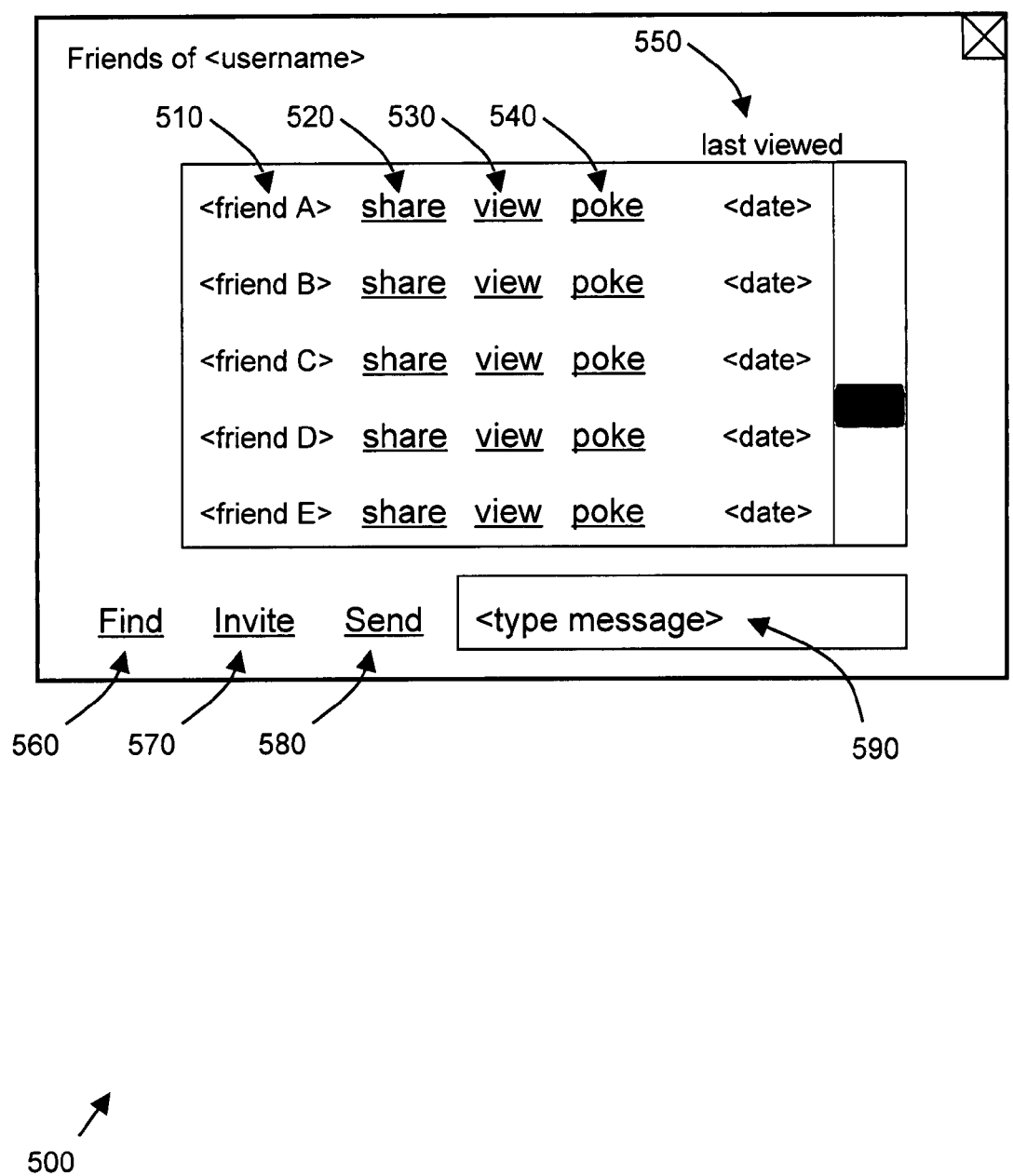
FIG. 5 shows an example of a GUI for interacting with friends of the user according to the present invention.

FIG. 5 shows an example of a user's friend list 500. A user is able to share 520 the information shown on the user profile by selecting a friend from the names displayed 510 and pressing the share button 520. A link to the user's profile or links to charts of the user's behavioral and psychological data will be sent to the selected friend. Information on the last time a friend viewed the user's profile 550 can also be displayed. A user can view 530 the profile of a friend if the friend has a user profile, i.e. if the friend is also registered with the social network.

A user can also send a message or a poke 540 a friend. A poke 540 is a communication that does not contain a lengthy message, instead, it indicates to the friend that the user was thinking about the friend and/or viewed the friend's profile. A poke can be simply sent by clicking one or more buttons. A custom message can be entered in the message text box 590 and sent by pressing the send button 580. Alternatively, a message can be selected from a set of predetermined messages.

Figure 6:
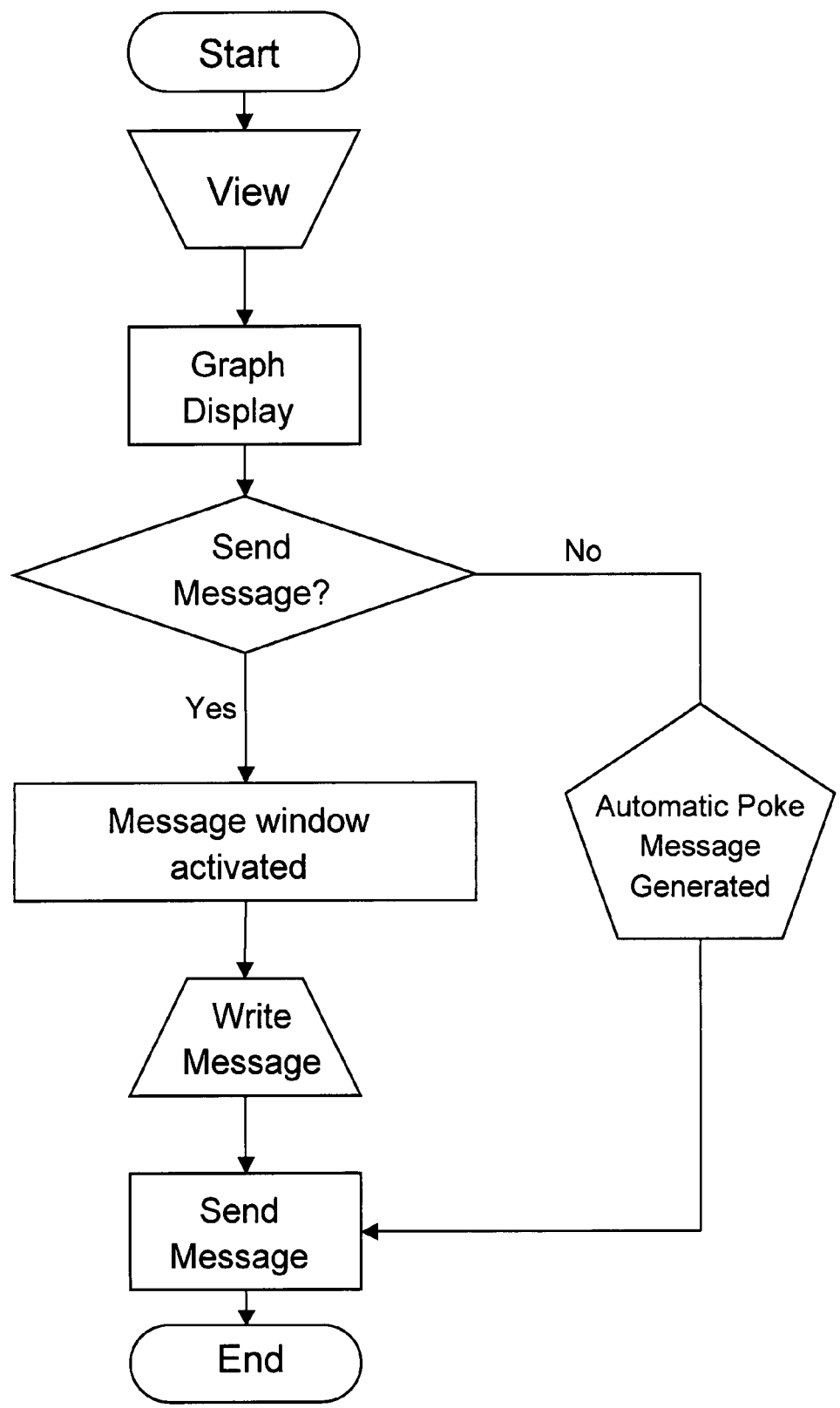
FIG. 6 is a flow chart showing an example of how a friend of a user sends motivational messages to the user according to the present invention.

FIG. 6 is a flow chart showing an example of how a friend of a user views the user's profile and sends a motivational message to the user. In one aspect of the present invention, an automatic poke is generated whenever a user's profile is viewed. The automatic poke notifies the user that one of the user's friends is observing the user's progress and further helps in motivating the user.

Figure 7:
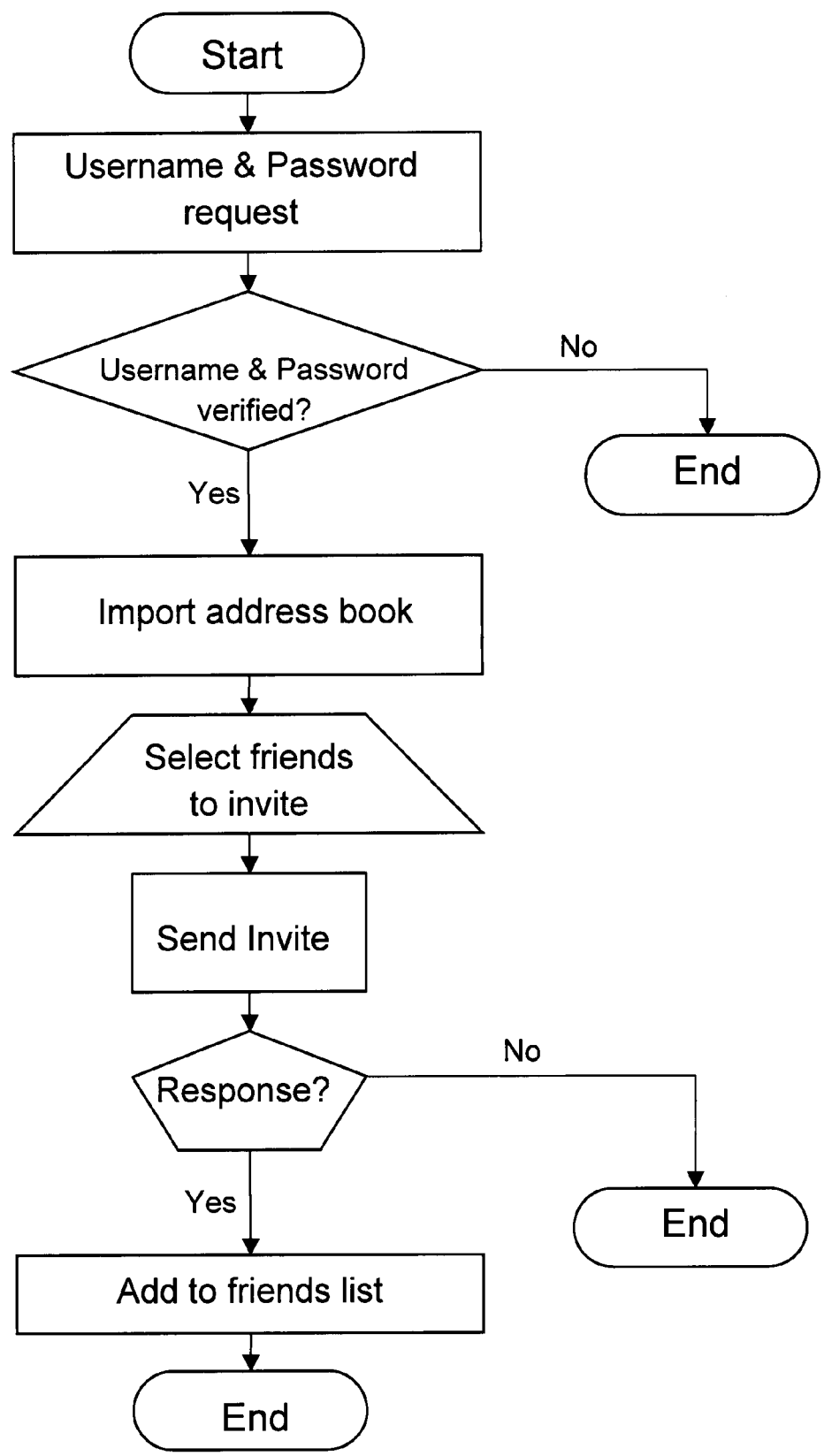
FIG. 7 is a flow chart showing an example of how a person can be invited to become a friend of a user on the social network according to the present invention.

A user may also find 560 and invite 570 other people to become friends. FIG. 7 is a flow chart showing an example of how friends can be invited and added to a user's friend list. As shown in FIG. 7, friends can be found by importing the address book on a user's email account. The members listed on an imported address book can be viewed and selected by the user. An invitation can be sent to the selected members. Alternatively, a user can send invitations by manually entering email addresses. A user can invite people who are not registered members of the social network to become friends with the user. By allowing not registered viewers to become a part of the social network, a user has access to a greater number of potential motivators. An invitation to register with the social network can also be sent to non-registered viewers.

A function is also provided for grouping registered users into a plurality of support groups. FIG. 8A shows an example of how twelve registered users R are grouped into three subgroups. The grouping is based on the customization of the user profile instead of by questions directed to the user, since requiring a user to answer detailed questions is tedious to the user. Furthermore, answers to directed questions could fail to elucidate real personality traits of a user because the user's awareness that the questions are for matching the user with others or with appropriate services may affect the user's responses.

Figure 9:
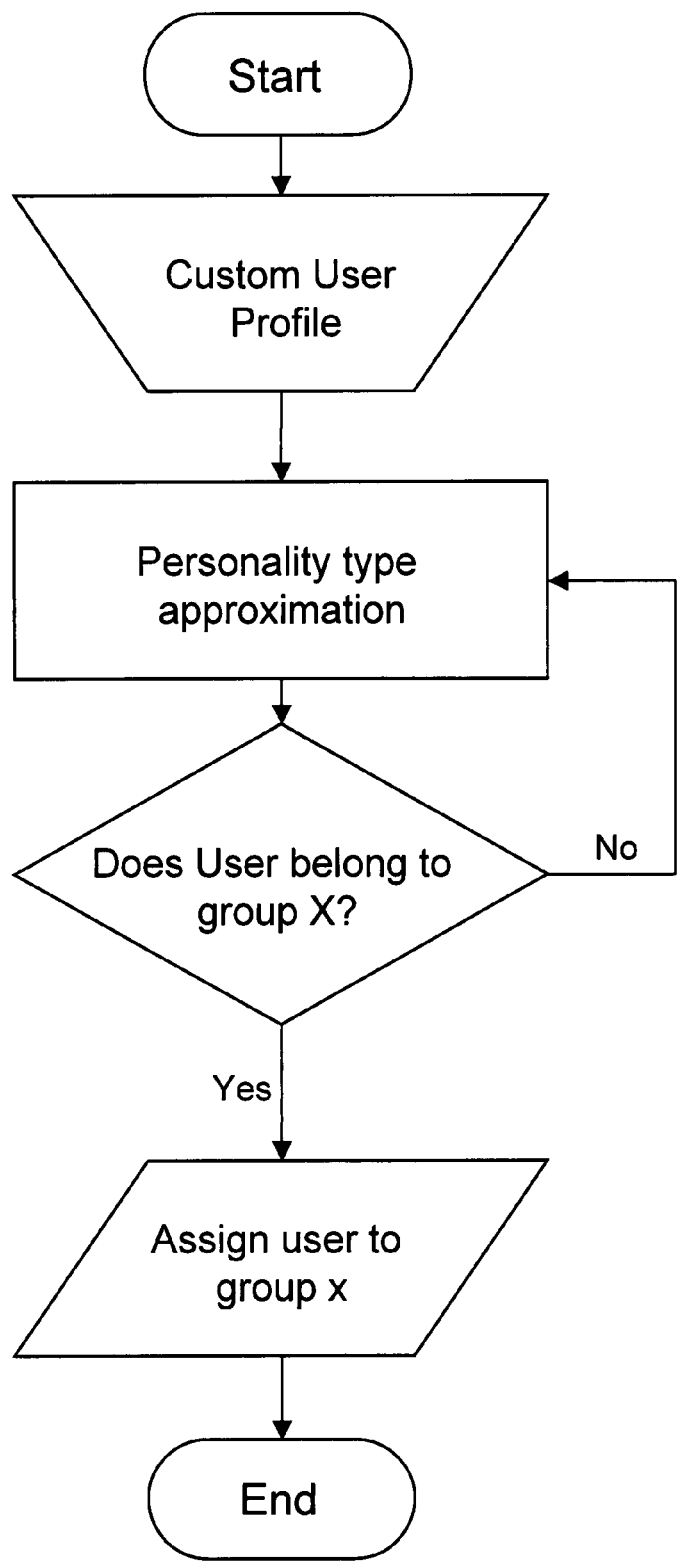
FIG. 9 is a flow chart showing an example of how a registered user is placed in a support group of registered users according to the present invention.

In the present invention, choices a user makes in selecting themes and icons for the user profile reveal personality traits and interests. Furthermore, the customization of the profile is a simple process. The personality traits and interests are then used to estimate compatibility with other users. For example, the water icon can be between choices of the "best place to drink water" or the "best ways to drink water," which may reveal traits such as gregariousness or shyness. The vegetable and fruit icons may represent different types of vegetables and fruits and users can be grouped according to common selections. The exercise icon can be chosen from different sports or active hobbies, which indicates user interests. Similarly, the choice of a coach character could be used for grouping users. The theme of the user profile could also be indicative of personality types. The choice of colors and layout could reveal traits such as masculine, feminine, bright and positive, dark and foreboding, mechanical, industrial, natural, or outdoorsy. FIG. 9 is a flowchart of an example of how grouping registered users into support groups is accomplished.

The membership of the support groups can also change, based on changes to the user profiles, the satisfaction of the users with their support groups, and success of the registered users in changing behavior. To determine user satisfaction with a support group, users can rate the support group in which they belong. FIG. 8B shows the same registered users R as in FIG. 8A but with different group memberships based on the above criteria. An algorithm can be used to update the groupings. By using this feedback mechanism, a program can constantly adapt, refine, and learn how to better determine compatibility of users.

Figure 10:
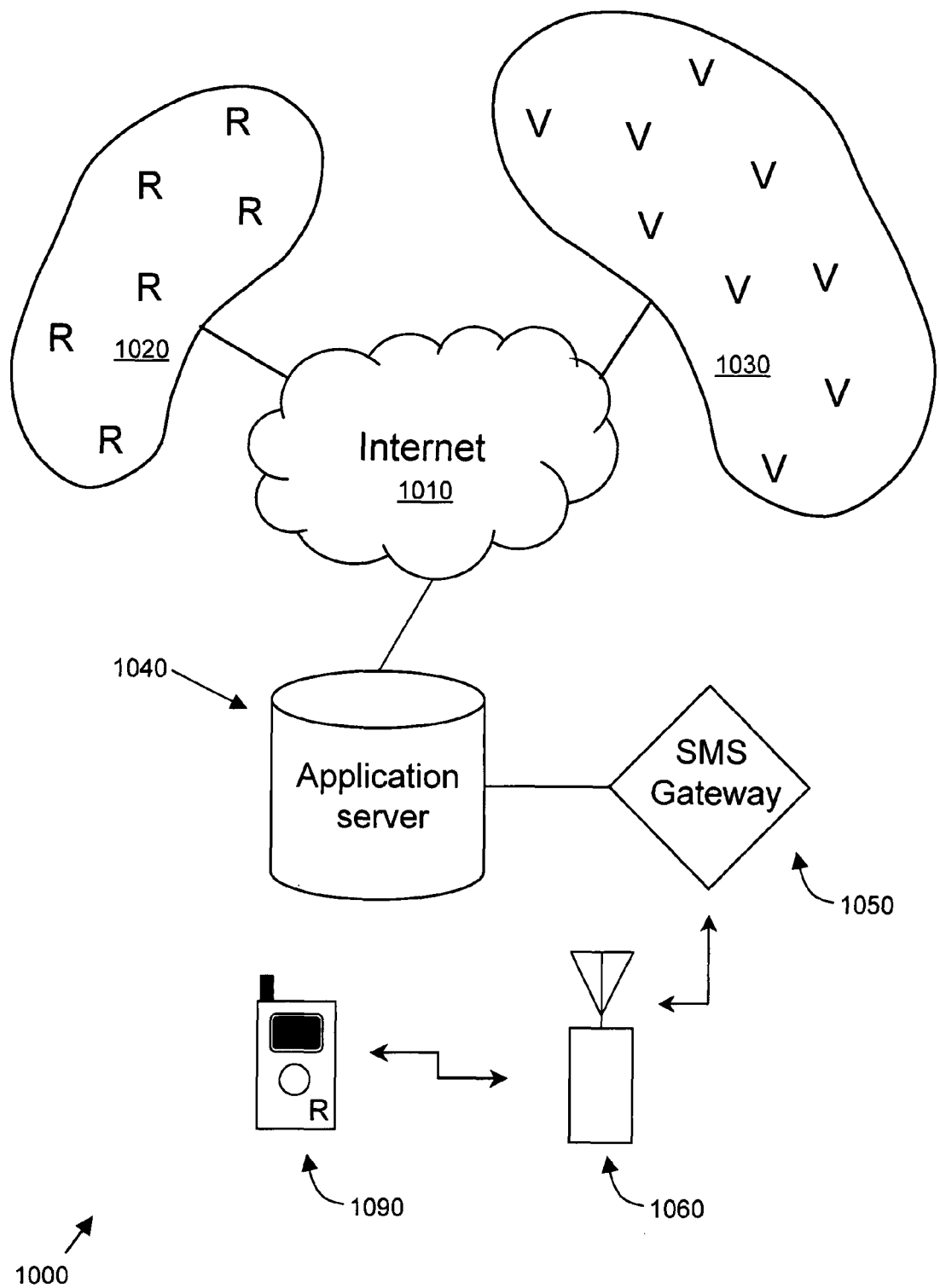
FIG. 10 shows an example of a network structure that includes a wirelessly connected portable device for affecting personal behavior according to the present invention.

Because success in affecting personal behavior strongly depends on consistent motivation, access to the sources of motivation could be key to the success. For a user of the social network of the present invention who has a busy schedule or who travels often, portable access to the social network would be extremely beneficial. FIG. 10 shows an example of a network structure 1000 that enables a user to access the social network with a portable device 1090.

According to an example of the present invention, the computer implemented social network 1000 of registered users 1020 and not registered viewers 1030 is connected through the Internet 1010. An application server 1040 operates the social network. In addition, a wireless gateway 1050 is connected to the application server 1040. The wireless gateway wirelessly communicates to a portable device 1090 via an antenna 1060. The wireless gateway can be a Short Message System (SMS) gateway or any other wireless communication method including WIFI, Bluetooth, new emerging standards, as well as proprietary protocols. The communication can be encoded and transmitted in both directions.

Figure 11:
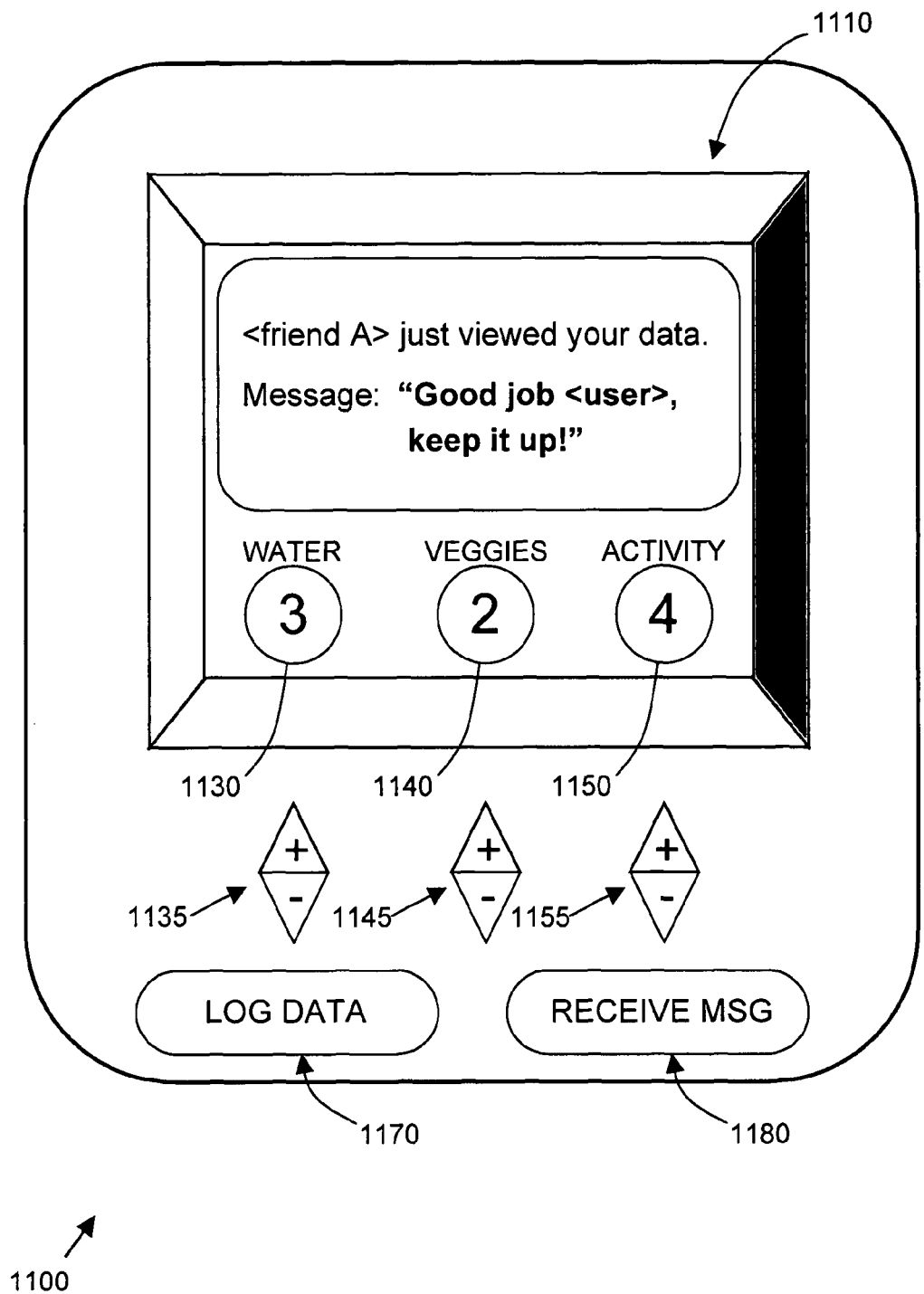
FIG. 11 shows an example of a portable device for affecting personal behavior according to the present invention.

FIG. 11 shows an example of a portable device 1100 for affecting personal behavior. A registered user of the network operates the portable device 1100. The device may include a display unit 1110 in which the user can view messages sent to the user. In other words, friends of the user can view the user's profile and send an encouraging message, a poke, or a stored message, to the user. The message is transmitted from the application server to the portable device via the wireless gateway. In addition to receiving messages, the user can also log data 1170 on the user's behavioral actions, emotional state, or both onto the portable device 1100. The behavioral actions of water consumption 1130, fruit and vegetable consumption 1140, and physical exercise 1150 are updated by buttons 1135, 1145, and 1155, respectively, on the portable device.

The portable device can be carried on the body of the user of the device and/or wearable by the user. The portable device 1100 may be a device made primarily for communicating with the social network or it may be a mobile phone, a wristwatch, a personal digital assistant, a portable music player, or any other portable device with wireless capabilities. The functionality of communicating with the behavior change social network can also be integrated with a portable medical device including an activity monitor, such as an accelerometer or pedometer, a blood glucose meter and/or insulin delivery device, a blood pressure monitor, or any combination thereof. The signal of the portable medical can also be used to determine an amount of behavioral actions undertaken by the user. The determination of behavioral actions can be done by user entry or automatically by a program. For example, ten minutes of excited activity signal measured by a accelerometer worn by a user would automatically send a communication from the pedometer to the application server to increase the amount of physical activity undertaken by the user.

In a preferred embodiment of the portable device, a user can log data with a simple code in which the user enters a number between 0 and 9 for each of the behavioral actions. The number corresponds to an amount of activity done by the user during the current day. The entered data would then be transmitted from the portable device to the application server via the wireless gateway Aside from ease of use, the simple code would allow straightforward integration of an existing portable device with the social network application. The portable device also allows a user to update activity and diet information at any time, thereby allowing the supporters of the user to view the progress of the user in real time.

As one of ordinary skill in the art will appreciate, various changes, substitutions, and alterations could be made or otherwise implemented without departing from the principles of the present invention, e.g. the Internet could be substituted by a local area network. Accordingly, the scope of the invention should be determined by the following claims and their legal equivalents.

What is claimed is:

1. A method for affecting personal behavior using a computer implemented social network, comprising:
   (a) having said computer implemented social network of a plurality of registered users to said social network and a plurality of viewers, wherein said viewers are not registered users to said social network;
   (b) providing a user profile function allowing each of said plurality of registered users themselves to create a user profile by:
      (i) entering a plurality of attributes associated with the same of said plurality of registered users;
      (ii) defining at least one behavioral icon, wherein each of said at least one behavioral icon represents at least one behavioral action; and
      (iii) defining at least one psychological icon, wherein each of said at least one psychological icon represents at least one psychological state;
   (c) providing an updating function allowing each of said plurality of registered users themselves to update:
      (j) said at least one behavioral action;
      (jj) said at least one psychological state; or
      (jjj) said at least one behavioral action and said at least one psychological state
   (d) maintaining a list of one or more friends linked with one of said plurality of registered users, wherein said one or more friends are allowed to view said user profile of said linked registered users, wherein said one or more friends comprise:
      (k) at least one of said plurality of registered users;
      (kk) at least one of said plurality of not registered viewers; or
      (kkk) said (k) and said (kk); and
   (e) providing a motivating function that allows said one or more friends of one of said plurality of registered users to motivate the same of said plurality of registered users, wherein motivating is accomplished by sending a communication to the same of said plurality of registered users, wherein said communication is a poke, a message, or a poke and a message.

2. The method as set forth in claim 1, further comprising grouping said plurality of registered users into a plurality of support groups based on said user profile of each of said plurality of registered users.

3. The method as set forth in claim 2, further comprising providing a rating function allowing each of said plurality of registered users to rate said grouping.

4. The method as set forth in claim 3, wherein said grouping is updated based on said rating and the success of each of said plurality of registered users in affecting personal behavior.

5. The method as set forth in claim 1, further comprising inviting at least one of said plurality of viewers to become registered to said computer implemented social network.

6. The method as set forth in claim 1, further comprising automatically sending said poke to said registered user to be motivated when said user profile of said registered user to be motivated is viewed by said one or more friends of said registered user to be motivated.

7. The method as set forth in claim 1, wherein said method affects weight control and wherein said at least one behavioral action comprises water intake, fruit and vegetable consumption, and physical activity.

8. The method as set forth in claim 1, wherein said at least one psychological state comprises a mood, wherein said mood is represented by multiple predetermined emotional states.

9. The method as set forth in claim 1, wherein said at least one psychological state comprises a mood, wherein said mood is represented by a plurality of emoticons.

10. The method as set forth in claim 1, wherein said creation of said user profile for each of said plurality of registered users further comprises selecting an animated graphical image to be a coach character.

11. The method as set forth in claim 1, wherein said motivating communication is sent via a wireless gateway to a portable device, wherein said motivating communication is sent by one or more of said friends of one of said plurality of registered users to the same of said plurality of registered users.

12. The method as set forth in claim 1, wherein said updating by one of said registered users is accomplished by entering data on a portable device.

13. A system for affecting personal behavior, comprising:
   (a) an application server for operating a computer implemented social network of a plurality of registered users to said social network and a plurality of viewers, wherein said viewers are not registered users to said social network, wherein said application server:
      (i) hosts a user profile for each of said plurality of registered users of said social network;
      (ii) stores behavioral data representing at least one behavioral action for each of said plurality of registered users; and
      (iii) maintains a list of one or more friends for each of said plurality of registered users, wherein said one or more friends of each of said plurality of registered users comprises at least one of said plurality of registered users, at least one of said plurality of viewers, or at least one of said plurality of registered users and at least one of said plurality of viewers, wherein said one or more friends of each of said plurality of registered users can view said user profile of the same of said plurality of registered users;
(b) a portable device used by one of said plurality of users; and
(c) a wireless gateway for communication between said portable device and said application server;
wherein said user of said portable device can enter said behavioral data onto said portable device and transmit said entered behavioral data to said application server via said wireless gateway; and
wherein said one or more friends of said user of said portable device can send a motivating communication to said portable device via said wireless gateway and said user of said portable device can view said communication on said portable device.

14. The system as set forth in claim 13, wherein said motivating communication is a poke, a message, or a customized short message, wherein said customized short message is stored by said application server.

15. The system as set forth in claim 14, wherein said poke, said message, or said customized short message is automatically sent from said application server via said wireless gateway to said portable device when said user profile or said behavioral data of said user of said portable device is viewed by one of said supporters of said user of said portable device.

16. The system as set forth in claim 13, wherein said wireless gateway is a SMS gateway and wherein said portable device is a mobile phone, a wristwatch, a personal digital assistant, a portable music player, or a portable medical device.

17. The system as set forth in claim 13, wherein said user of said portable device can enter said behavioral data onto said portable device by entering a numerical value between 0 and 9, wherein said numerical value represents an amount of said at least one behavioral action undertaken by said user of said portable device.

18. The system as set forth in claim 13, wherein said application server charts said behavioral data of each of said plurality of registered users.

19. The system as set forth in claim 13, wherein said personal behavior to be affected is weight control and wherein said at least one behavioral action comprises water intake, fruit and vegetable consumption, and physical activity.

* * * * *